Aug. 11, 1959  R. J. LEVINE  2,899,151
CAPACITIVE PROPORTIONING SYSTEM
Filed April 3, 1953  2 Sheets-Sheet 1
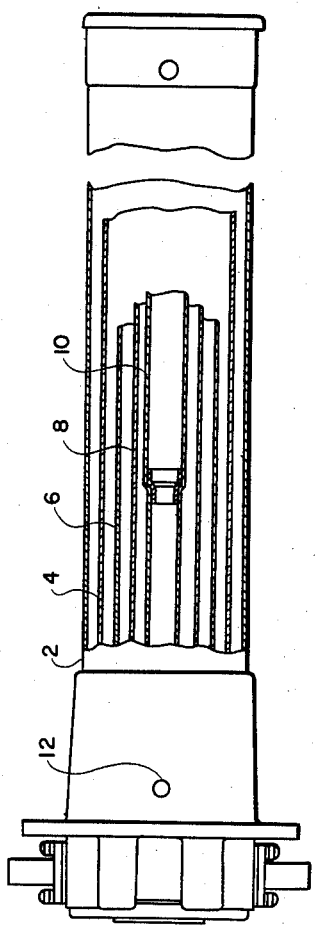
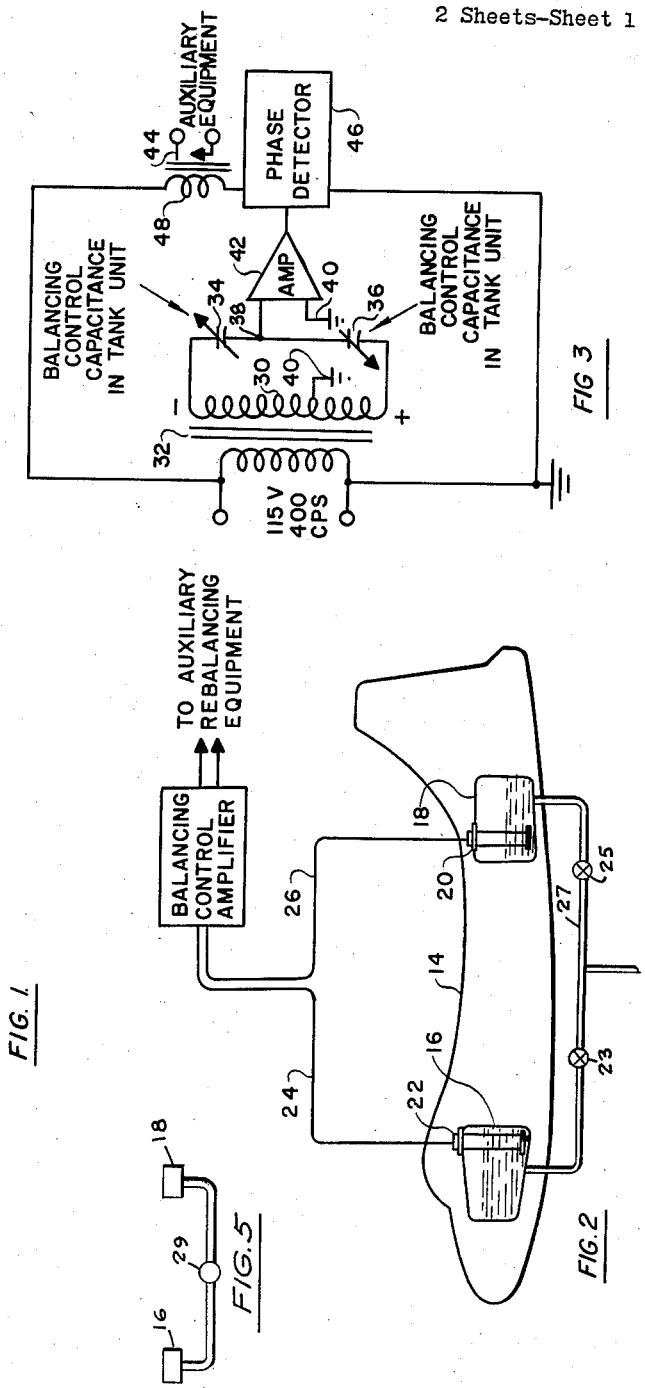
INVENTOR
Robert J Levine
BY *Leonard H. King*
AGENT Aug. 11, 1959

R. J. LEVINE 2,899,151

CAPACITIVE PROPORTIONING SYSTEM

Filed April 3, 1953

INVENTOR
Robert J. Levine

BY  Leonard H. King

AGENT

United States Patent Office 2,899,151
Patented Aug. 11, 1959

2,899,151

CAPACITIVE PROPORTIONING SYSTEM

Robert J. Levine, New York, N.Y., assignor, by mesne assignments, to Avien, Inc., Woodside, N.Y., a corporation of New York Application April 3, 1953, Serial No. 346,735

4 Claims. (Cl. 244—77)

This invention relates to capacitive type liquid level measuring apparatus and in particular proportionating systems utilizing such apparatus.

In an aircraft several tanks are used to contain the fuel supply. These tanks are distributed in various portions of the aircraft such as, in the wings, and in fore and aft portions of the fuselage.

This invention provides a proportionating control system whose chief function is to maintain a predetermined relationship between the weights or levels of fuel in each of two tanks. In so doing, the system can control the withdrawal of fuel from the tanks so as to maintain the center-of-gravity of the aircraft constant. Basically, the system compares the quantities of fuel in each of the two tanks, such as in the tanks in each of the wings, and produces no outward signal when the two quantities are in balance. In the event that one tank begins to empty faster than a predetermined rate, an output signal is produced. This signal, after being amplified is used to control a relay. In turn, the relay controls correcting devices such as, pumps or valves until balance is restored.

It is an object of this invention to provide a balancing control system for an aircraft fuel system.

It is another object of this invention to provide a method and apparatus for maintaining the center-of-gravity of an aircraft constant.

It is a further object of this invention to provide an improved unit for insertion in a liquid which will provide an indication of liquid level for purposes of quantity determination and further supply an indication of liquid level suitable for the operation of a balancing control system.

A particular object of this invention is to provide an improved liquid level sensing capacitor for use in a proportionating system.

The invention may be more readily understood by reference to the following description and appended drawings.

In the drawings:

Figure 1 shows partially sectioned a level sensing capacitor of this invention.

Figure 2 shows schematically and partly pictorially a proportionating system applied to an aircraft fuel system.

Figure 3 is a simplified schematic diagram of the control system of this invention.

Figure 4 provides a schematic diagram of the preferred control system of this invention.

Figure 5 shows pictorially a balancing control system of this invention incorporating a fuel transferring system.

In the various figures, like numbers refer to like items.

In Figure 1 there is shown a typical tank unit of this invention which consists of a housing member 2 containing a pair of concentric cylindrical electrodes 4 and 6 which are used as the capacitor forming part of a control circuit. Electrodes 8 and 10 serve as the two electrodes of a liquid level sensing capacitor which may be connected to a capacitive type quantity measuring system. The various electrodes are rigidly supported by insulators (not shown) so as to maintain the interelectrode spacing constant. A number of holes 12 are provided to permit the limited access of liquid and air within the housing. In the typical installation shown in Figure 2, an aircraft 14 is provided with fore tank 16 and aft tank 18 containing respectively tank units 20 and 22 containing sensing capacitors. The capacitors are connected by cables 24 and 26 to a balancing control amplifier 28 having an output adapted to control auxiliary rebalancing equipment such as pumps and valves.

With reference to the simplified diagram of Figure 3, there is shown a tapped secondary winding 30 of transformer 32, the winding forming two legs of a bridge circuit. Proportionating control capacitors 34 and 36 form the other two arms of the bridge. If the bridge were in a balanced condition, the same voltage would appear between point 38 and ground 40. Therefore, no signal would be applied to the amplifier 42. While dependent on the needs of the actual installation, it is assumed for purposes of explanation that the normal operation of the system being described is such that the relay contacts 44 used to control the auxiliary equipment are normally open. The phase detector circuit 46 is adjusted so that when the capacitance of capacitor 34 and capacitor 36 differ by a suitable magnitude, a signal is supplied by the amplifier 42 of such phase with relation to a comparison signal applied to the phase detector 46 that relay 48 is energized and relay contacts 44 are closed actuating the auxiliary control equipment. To satisfy this condition, let it be assumed that the capacitance of the balancing control capacitor 34 must be larger than the value needed for a balanced bridge circuit. Therefore, the balancing control capacitance of capacitor 36 must also be greater than the value required for circuit balance.

If the balancing control capacitance of capacitor 34 drops below the value required to balance the bridge circuit, the input signal to the amplifier becomes of such phase relationship because of the increased reactance in that leg of the bridge, that the signal applied to the phase detector 46 results in de-energizing the relay thus causing the relay to open. In turn, fuel is withdrawn from the other tank until the fuel level is again unbalanced in the other direction. As pointed out previously, the values of the balancing control capacitances and the adjustments of the bridge circuit normally keep the relay contacts closed. As the fuel levels drop in both tanks, the balancing control capacitance should decrease in such a fashion that the ratio between them remains constant. Since the purpose of the balancing control system is to prevent a large unbalance of fuel levels, it is apparent from the preceding discussion that capacitor 36 is installed in the fuel tank which is most likely to empty at the greater proportionate rate.

If the system is adjusted to withdraw fuel from both tanks at a particular rate and the tank containing capacitor 34 empties at too great a rate, its balancing control capacitance will decrease too rapidly upsetting the bridge capacitance ratio. Consequently, the out of phase output developed by the bridge circuit will cause the control relay contacts to open actuating auxiliary equipment effecting rebalance of the fuel levels.

While a perfectly linear relationship may be provided between the fuel consumption from two tanks, this system is flexible and will permit any reasonable functional relationship. This may be accomplished, for example, by "profiling" the electrodes forming the balancing control capacitance. This may be accomplished, for example, by perforating or shaping one electrode in a non-linear manner so that a change in fuel level does not produce a proportionate change in capacitance; electrode 10 is shown so "profiled."

The importance of "profiling" may best be understood by considering two tanks, one having a cross-sectional area of A sq. feet and one having an area of 2A sq. feet. For a drop in level of one foot, it is apparent that the fuel in one tank will be reduced in volume by A cubic feet and the other tank by 2A cubic feet. Since the capacitance of identical sensing capacitor in both tanks will vary the same amount, the function of balancing may not be accomplished. However, a properly "profiled" capacitor will overcome this difficulty by balancing the bridge when the proper weight (volume) ratio exists as opposed to simple liquid level ratio.

The preferred embodiment of this invention incorporates a bridge circuit differing slightly from the simplified circuit shown in Figure 3. Tank unit 20 has its balancing control capacitor 36 connected by cables 50 and 52 to the wiper arm 54 of "ratio adjustment potentiometer" 56, instead of to the end of transformer secondary winding 30. By controlling the voltage applied to the leg of circuit formed by the capacitance 36 of tank unit 20, the potentiometer 56 determines the product capacitance times voltage of the bridge circuit containing capacitor 36 and hence, the effective ratio between the capacitance of capacitor 36 and capacitor 34 which must exist to achieve the desired operating point. Capacitance 34 in tank unit 22 is connected to the bridge circuit in parallel with fixed capacitor 58 by means of cables 60 and 62. Capacitor 58 serves to provide a shift in operating point so as to permit one tank to be fully emptied so as to avoid ambiguous conditions at low level. A tap 64 rather than one end of the transformer primary 66 is grounded so that a portion of the winding between taps 64 and 68 can supply filament voltage to filaments 70 and 72 of the tubes 74 and 76 in the unit. A two stage amplifier circuit is provided which utilizes both triode sections of tube 74 as voltage amplifiers. Bridge voltage is applied across a grid-leak resistor to the grid of the first half of tube 74. Output voltage is developed across a 1200K ohm plate load resistor. The output signal coupled by means of a conventional blocking capacitor appears across an 82K resistor in series with a 1 mg. ohm resistor. This signal voltage is applied to the grid of the second half of tube 74. Output voltage is developed across a plate load resistor having a value of 120K ohms and is coupled by means of a blocking capacitor to tube 76, the first half of which serves as a phase detector. Cathode bias is provided by 1200 ohm resistor. It will be noted that negative feed back is employed to increase the stability of the amplifier circuit. Current feedback is introduced in both voltage amplifier stages by the by-pass cathode resistors. Voltage feedback is also used wherein a portion of the output from the second half of tube 74 is coupled back to the cathode of the input stage (first half of tube 74). The cathode resistor and the 240K ohm resistor forming a voltage divider network.

The phase detector (the first half of tube 76) is essentially a relay amplifier whose conduction is governed by the phase of the grid signal. Plate voltage is applied to the coil of the relay 48. The relay coil is tuned to 400 c.p.s. by the capacitor connected in parallel thereto. The grid voltage is the output of the amplifier circuit obtained from the wiper arm of potentiometer 92. This potentiometer and the 220K ohm resistor form a voltage divider network in the phase detector grid circuit. When the grid voltage is in phase with the plate voltage, the tube conduction through the relay coil is sufficient to energize the relay. However, when the grid and plate voltages are out of phase the tube conduction is small and the relay is unenergized. Resistor 78 and capacitors 80 and 82 serve as the filter network for the rectified output. When the relay 48 is actuated normally closed contacts 86 and 88 open completing the circuit between 86 and contact 90 thus actuating auxiliary equipment such as a pump connected to the proper tank. Suitable values are shown on the diagram. Potentiometer 92 is provided as a means of regulating sensitivity. Cable receptacles and plugs 100 are provided to facilitate connecting conductors between the various units.

It is to be understood that the form of my invention, herewith shown and described, is to be taken as a preferred example of the same, and that various changes in the shape, component values and arrangement of parts may be resorted to, without departing from the spirit of my invention, or the scope of the sub-joined claims.

Having thus described my invention, I claim:

1. Apparatus for use with an aircraft having a first and a second fuel tank located on opposite sides of an axis of the aircraft about which the center of gravity is to be maintained, comprising: a first and a second measuring capacitor arranged to be positioned in the first and second fuel tanks respectively and having capacitor electrodes extending throughout the height of the fuel tanks, the capacitance value of said first and second capacitors being a function of the height of fuel in the individual fuel tanks; a center of gravity capacitance bridge, and means connecting said first and second measuring capacitors in opposite legs of said center of gravity bridge, the condition of balance of said center of gravity bridge thereby being a function of the center of gravity of the fuel in the first and second fuel tanks with respect to the aircraft axis.

2. Apparatus for use with an aircraft having a first and a second fuel tank located on opposite sides of an axis of the aircraft, comprising: a first and a second capacitance type tank unit arranged to be positioned in the first and second tanks respectively, each of said tank units having a first and a second capacitor, the capacitance value of the first capacitor being indicative of fuel quantity and the capacitance value of the second capacitor being indicative of fuel moment about the aircraft axis; a center of gravity responsive network, and means connecting the second capacitor of said first and said second tank units to said center of gravity responsive network to cause the output of said center of gravity responsive network to be indicative of the condition of moment balance of the first and second fuel tank with respect to the aircraft axis.

3. Apparatus for use with a craft having a control means responsive to a control signal and first and second fluid loads, whose magnitudes can be controlled by the control means, with the loads located on opposite sides of an axis of the craft about which it is desired to control the center of gravity, comprising: a first capacitive measuring means associated with the first load and arranged to be immersed therein to an extent relative to the level of the first load, and to vary in capacitance, to an extent relative to the magnitude of the first load, so as to provide a first signal indicative of the moment of the first load with respect to the axis; a second capacitive measuring means associated with the second load and arranged to be immersed therein, to an extent relative to the level of the second load and to vary in capacitance, to an extent relative to the magnitude of the second load, so as to provide a second signal indicative of the moment of the second load with respect to the axis; network means connected to said first and said second measuring means and responsive to the ratio of the signals from said first and second measuring means to provide a control signal indicative of the center of gravity of the first and second loads, and means to apply said control signal to the control means so as to vary the magnitudes of the first and second loads in a direction tending to maintain the center of gravity of the craft.

4. Apparatus for use with an aircraft having a first and a second fuel tank located on opposite sides of an axis of the aircraft, comprising: a first and a second capacitance type tank unit arranged to be positioned in the first and second tanks respectively, each of said tank units having a capacitor arranged to be immersed in fuel confined in the respective tanks to an extent related to the level of the confined fuel, the capacitance value of the capacitor being indicative of fuel moment about the aircraft axis; a center of gravity responsive network adapted to compare the ratio of the capacitance values of the capacitors of said first and second tank units, and means connecting the capacitors of said first and said second tank units to said center of gravity responsive network to cause the output of said center of gravity responsive network to be indicative of the condition of moment balance of the first and second fuel tank with respect to the aircraft axis.

References Cited in the file of this patent

UNITED STATES PATENTS

| | | |
|---|---|---|
| 2,403,749 | O'Neal | July 9, 1946 |
| 2,485,579 | Elliott | Oct. 25, 1949 |
| 2,500,348 | De Giers | Mar. 14, 1950 |
| 2,509,629 | De Giers | May 30, 1950 |
| 2,511,398 | De Giers et al. | June 13, 1950 |
| 2,529,015 | Levkovitsch | Nov. 7, 1950 |
| 2,541,429 | Mathes | Feb. 13, 1951 |
| 2,577,435 | Siebenthaler | Dec. 4, 1951 |
| 2,585,480 | Makhonine | Feb. 12, 1952 |
| 2,618,157 | Keeling | Nov. 18, 1952 |
| 2,656,977 | Cummings | Oct. 27, 1953 |
| 2,672,880 | Hermanson | Mar. 23, 1954 |
| 2,724,273 | Sontheimer | Nov. 22, 1955 |
| 2,763,283 | Griffith et al. | Sept. 18, 1956 |
| 2,793,529 | Bancroft | May 28, 1957 |